J. F. PEACOCK.
Door-Knob Attachment.
No. 208,924.  Patented Oct. 15, 1878.
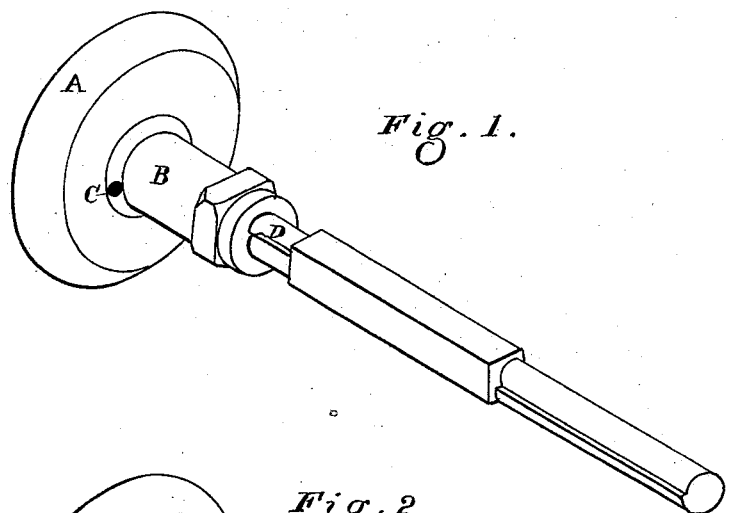
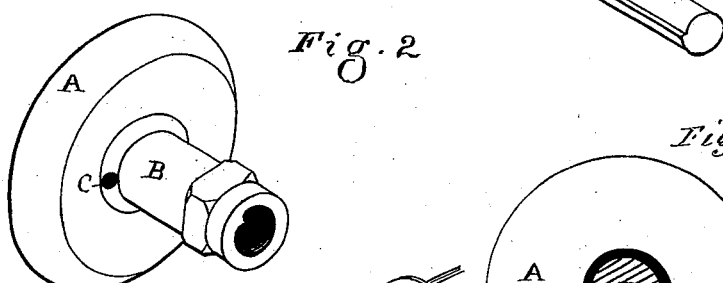
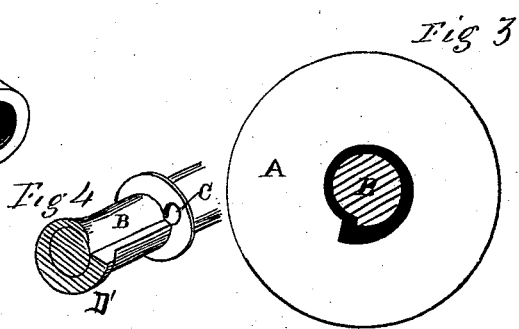
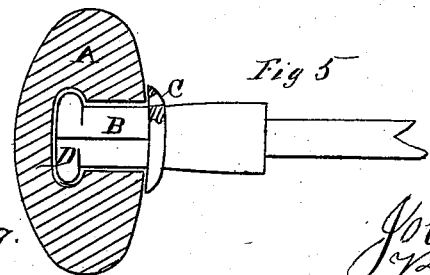
Witnesses
Geo. H. Strong
Jno. L. Boone
Inventor
Job F. Peacock
By his Atty's
Dewey & Co.

UNITED STATES PATENT OFFICE.

JOB F. PEACOCK, OF RENO, NEVADA.

IMPROVEMENT IN DOOR-KNOB ATTACHMENTS.

Specification forming part of Letters Patent No. 208,924, dated October 15, 1878; application filed March 18, 1878.

*To all whom it may concern:*

Be it known that I, JOB F. PEACOCK, of Reno, county of Washoe and State of Nevada, have invented an Improved Door-Knob Fastening; and I do hereby declare the following to be a full, clear, and exact description thereof, reference being had to the accompanying drawings, in which—

Figure 1 is a general view. Fig. 2 is a view of the shank. Figs. 3, 4, and 5 are details.

My invention relates to certain improvements in door-knobs; and consists in forming a hollow in the knob in the form of an eccentric or cam, with an enlargement at its inner end, into which hollow is inserted an eccentric or cam-shaped shank, having its head enlarged and screw-shaped. On inserting the shank into the correspondingly-shaped recess and turning it half round, the screw-shaped head turns into the enlargement in the inner end of the recess, and the whole outer surface of the shank is brought forcibly in contact with the similarly cam-shaped inner surface of the recess, so as to keep the shank in position, hot metal being poured by appropriate means into the interstices in the recess, and assisting in holding the shank in place. The shank is also recessed in an eccentric or double or single cam shape to correspond to the eccentric-shaped shaft which connects the two knobs on opposite sides of the door. By inserting this eccentric-shaft in the recess in the shank and twisting it firmly into place, a cold-weld point, as it were, is made, holding the shaft in place, so that knobs fitted with this device may be placed on any thickness of doors without the use of screws in any part.

A is a door-knob, having a cam-shaped shank-opening, the rear part of the opening being somewhat enlarged, for the purpose hereinafter described. The shank B has that portion of it beyond the shoulder made in a cam shape, and the head D′, while also preserving the form of the cam, is enlarged, so as to form a screw or inclined head. The shank B, on being inserted in the cam-shaped recess in the knob, is turned part way round, when the cam and screw shaped head draws the shoulder on the shank firmly against the knob, and also secures the shank in place. The shank is then held in place by the friction of the particles of metal uniting all around the cam-shaped part of the shank and head in the act of twisting it on and by the enlarged screw-shaped head being bedded in the enlargement of the recess in the knob. A small hole, C, is formed in the shoulder, as shown, at the narrowest part of the cam, into which soft metal may be poured, which, by filling up the space around the cam and the screw-shaped head, will more effectually lock the shanks in place. The shank is also hollow, the hole being formed so as to correspond to and receive the single or double eccentric-shaft D, which passes through the door and connects the knobs on both sides. This cam or eccentric shaft D fits nicely to the hole in the outer portion of the shank, having very little play. By turning or twisting the shaft, its cam-shaped form admits of it being wedged in place by the particles of metal uniting themselves, so as to form, as it were, a cold-weld joint by making the shaft which connects the two knobs on opposite sides of the door in the form described. It is possible to have it admit of application to varying sizes of doors, from one to two and a half inches in thickness, or more. The knobs can also be made to fit simply to the door without the use of washers or other devices.

It will thus be seen that my device does away with the screws, washers, &c., heretofore necessary to fasten knobs on doors, and that a pair of knobs may be fitted to a door more neatly and closely than has been previously possible. The expense of drilling screw-holes and providing screws to knobs is done away with, and also the liability of the knobs becoming loose or falling off, as often occurs when screws are used. The eccentric-shaft has a perfect bearing for its whole length in the hole in which it rests when once twisted in, and by its use the knobs may be closely fitted without loss of time for measurements or the use of washers. The shank being also firmly fastened to the knob, in the manner described, without the use of screws, makes the whole door-knob a permanent solid arrangement, which may be operated without the slightest clicking or noise of any kind.

Having thus described my invention, what I claim as new, and desire to secure by Letters Patent, is—

1. The knob A, having a cam-shaped shank-opening and enlarged recess at the bottom, as shown, in combination with the cam or eccentric shaped shank B, having the inclined head fitting the shank-opening, and the soft-metal filling, substantially as shown, and for the purpose herein described.

2. The shank B, having the eccentric or cam shaped opening, as shown, in combination with the shaft or spindle D, with its eccentric or cam shaped surface, by which the knobs may be instantaneously adjusted and secured to the spindle, substantially as shown, and for the purpose herein described.

In witness whereof I have hereunto set my hand and seal.

JOB F. PEACOCK. [L. S.]

Witnesses:
 CHARLES L. QUEEN,
 HIRAM C. FREEMEN.